United States Patent
Lenzner

(10) Patent No.: US 10,788,957 B1
(45) Date of Patent: Sep. 29, 2020

(54) WEB PAGE DESIGNING WITH SANDBOXED CUSTOM EDITORS

(71) Applicant: salesforce.com, inc., San Francisco, CA (US)

(72) Inventor: Marcus Lenzner, Jena (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/547,912

(22) Filed: Aug. 22, 2019

(51) Int. Cl.
*G06F 3/048* (2013.01)
*G06F 3/0483* (2013.01)
*G06F 3/0484* (2013.01)

(52) U.S. Cl.
CPC .......... *G06F 3/0483* (2013.01); *G06F 3/0484* (2013.01)

(58) Field of Classification Search
CPC ........................... G06F 3/0483; G06F 3/04834
USPC .......................................................... 715/733
See application file for complete search history.

(56) References Cited

U.S. PATENT DOCUMENTS

| | | | | |
|---|---|---|---|---|
| 8,285,681 | B2 * | 10/2012 | Prahlad | G06Q 30/02 707/640 |
| 8,601,579 | B2 * | 12/2013 | Krsti | G06F 21/53 726/22 |
| 8,689,344 | B2 * | 4/2014 | Court | G06F 9/468 726/26 |
| 8,856,864 | B2 * | 10/2014 | Li | G06F 21/62 726/1 |
| 9,058,141 | B2 * | 6/2015 | Grosz | G06F 16/51 |
| 9,106,690 | B1 * | 8/2015 | Banga | H04L 63/1433 |
| 9,628,558 | B2 * | 4/2017 | Wouhaybi | G06F 21/10 |
| 9,773,264 | B2 * | 9/2017 | Brown | G06F 3/04817 |
| 9,823,824 | B2 * | 11/2017 | Pasquarette | G06F 3/04845 |
| 9,826,017 | B1 * | 11/2017 | Goldfeder | H04L 67/02 |
| 9,832,148 | B2 * | 11/2017 | Huang | H04L 63/083 |
| 10,162,805 | B2 * | 12/2018 | Grigorovitch | G06F 40/106 |
| 10,528,932 | B2 * | 1/2020 | Brown | G06F 40/166 |
| 10,565,402 | B2 * | 2/2020 | Bortz | G06F 40/134 |
| 10,607,001 | B2 * | 3/2020 | Lee | G06Q 10/10 |
| 10,635,828 | B2 * | 4/2020 | Lin | H04L 63/10 |
| 2011/0016431 | A1 * | 1/2011 | Grosz | H04N 1/387 715/841 |
| 2012/0204250 | A1 * | 8/2012 | Anderson | H04L 63/18 726/9 |
| 2012/0209907 | A1 * | 8/2012 | Andrews | G06F 16/9535 709/204 |
| 2014/0090008 | A1 * | 3/2014 | Li | G06F 21/6263 726/1 |
| 2014/0096013 | A1 * | 4/2014 | Grosz | G06F 3/0484 715/733 |
| 2014/0297516 | A1 * | 10/2014 | Brown | G06F 3/04817 705/39 |
| 2014/0324943 | A1 * | 10/2014 | Antipa | H04L 67/42 709/203 |

(Continued)

*Primary Examiner* — David Phantana-angkool
(74) *Attorney, Agent, or Firm* — Compass IP Law, PC

(57) ABSTRACT

Techniques for designing and previewing web pages include creating a component edit panel for a user interface of a web page designer application, creating a custom attribute editor; and creating a custom editor sandbox to isolate the custom attribute editor from other parts of the web page designer application. Further techniques include setting up a message channel to the custom attribute editor through the custom editor sandbox, and adding the custom editor sandbox to the component edit panel.

17 Claims, 12 Drawing Sheets

(56) References Cited

U.S. PATENT DOCUMENTS

2015/0154676 A1\* 6/2015 Matousek ............. G06F 3/0488
                                                    705/26.5
2019/0294422 A1\* 9/2019 Martel ................ G06F 9/44521

\* cited by examiner

WEB PAGE DESIGNING WITH SANDBOXED CUSTOM EDITORS

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2019, salesforce.com, Inc. All Rights Reserved.

TECHNICAL FIELD

One or more implementations relate to the field of world wide web (WWW) pages, and more specifically, to web page creation and previewing.

BACKGROUND

Online merchants can assemble content that is going to be rendered as part of a web page visible to a customer on a web site (e.g., a business to consumer (B2C) storefront online shopping page). This assembly process typically consists of combining multiple web page components in order to present a frequently changing visual experience to shopper. For example, the merchant may have a new advertising campaign to be scheduled for the upcoming holiday season and wants to build a landing page for this purpose. This landing page will likely contain may web page components, for example, multiple product tiles to promote products, a carousel of top selling products, a blog article describing product features and capabilities, and perhaps even content directed to certain demographic groups, and so on. Further, some components may be added and some components may be deleted from the web page based on time and/or customer segments. One challenge is how to design and preview these web pages prior to publication given the complexity of the changes.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes a method and apparatus for designing web pages in an efficient, scalable, secure and extensible manner. In embodiments, a web page designer application is provided that includes a custom attribute editor feature to allow a merchant operating the web page designer application to design and edit content for the web page in ways that are defined by the merchant, not by defined a priori by the developer of the web page designer application.

Proprietors of e-commerce web sites assemble web page content that is going to be rendered as part of a web page visible to customers. This assembly process typically consists of creating and/or selecting multiple components (e.g., text, images, videos, logos, product information, advertisements, reviews, etc.) in order to present a visual experience to the online shopper. In many cases, the web pages are changed frequently in order to keep the content fresh and engaging for the customer. In other situations, the web pages are updated to reflect changing business conditions, advertising campaigns, promotions, and seasons. For example, the merchant may have a set of web pages for the upcoming holiday season. Each web page contains multiple components.

One challenge to web page design is that it is difficult for a developer of the web page designer application to define and provide the capability to manage attributes of all of those components at the time of developing the web page designer application (e.g., "up front" at application design time, not later at the time of use of the web page designer application by the merchant/user). While the web page designer application provides for various common types for the attributes with a corresponding user interface (UI) representation (e.g., an attribute type "product" launches a product picker function, an attribute type "markup" launches a "rich text" editor, and so on) there will also be the need from merchants/users to be able to define their own types of attributes with corresponding customizable UIs. For example, a merchant may need a simple color picker function all the way to a sophisticated and complex third-party component integration with complex selectors and configurability as part of the attributes. Such a customizable UI for an attribute, called custom attribute editor herein, therefore should seamlessly integrate into the web page designer application. Further, the integration of a customer attribute editor should not expose the web page designer application to potential security (or other) issues of the custom code that implements the custom attribute editor. Although the solution for this problem is currently applied in context of a web page designer application, this approach may also be applied in other applications as a general design for how to implement secured/sandboxed custom attribute editors in UIs.

Figure 1:
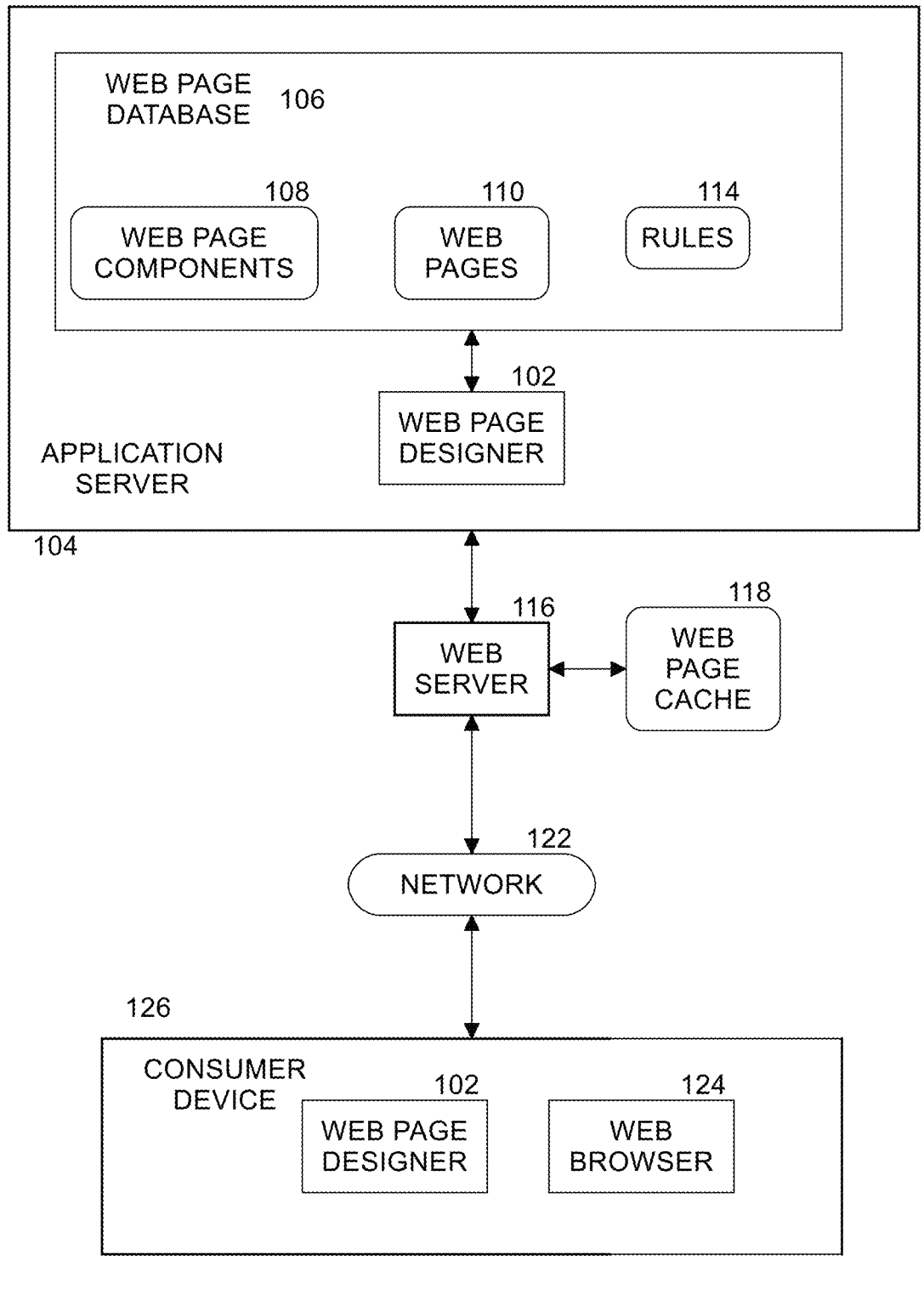
FIG. 1 is a diagram of an example arrangement of web page processing according to an embodiment.

FIG. 1 is a diagram of an example arrangement 100 of web page processing according to an embodiment. Application server 104 is a computer server that resides in a data center, either one managed by the merchant or by a cloud service provider (CSP). In an embodiment, application server 104 executes code to create hyper-text markup language (HTML) output. In an embodiment, application server 104 is not directly accessible by customers over a network such as the Internet. There may be multiple application servers managed by a CSP. An application server 104 includes a web page designer application 102. Web page designer application 102 is an application program used by the merchant (or by a web site developer contracted to design the web site for the merchant) to design web pages 110 for an on-line storefront (e.g., a merchant web site for selling goods (e.g., products) to customers). In an embodiment, a server portion of web page designer 102 runs on application server 104. In another embodiment, at least a portion of web page designer 102 (e.g., a client portion) runs on a consumer device 126 (such as a computer system) operated by a merchant. The merchant assembles one or more web pages 110 during the design process from multiple web page components 108 using web page designer 102. Web pages 110 include code and/or data that define the web site's format, function and visual appearance. A web page is an assembly of components that can be rendered on the web site. Web pages may be of different page types. A page type includes a definition of a layout and code to produce descriptions of the layout.

In an embodiment, the merchant's web site is run on a cloud computing platform provided by the CSP. Application server 104 includes a web page database 106, which may be integral with the application server or accessible by application server 104 within a cloud computing platform. Web page database 106 includes web pages 110 and web page components 108. Web page components 108 include content items that can be created, selected, and/or configured by the merchant, such as text, images, videos, logos, product codes, product images, banners, advertisements, and so on. Components may include other components in a nested manner. A component may be categorized according to a component type. A component type is a definition of configuration options, and code that produces a markup of a component. The component type may define sub-layouts for nested components.

Web page database 106 includes one or more visibility rules 114. In an embodiment, visibility rules 114 include visibility conditions for one or more components in web page components 108 and web pages 110. Visibility rules 114 are used by web page designer 102 to determine when and under what conditions web page components 108 are to be included and/or visible in web pages 110 to a specific customer at a specific time. Conditions can be based on one or more of any characteristics, customer attributes, demographic information, time, geographic location, Internet Protocol (IP) address, interests, or any other data. In an embodiment, visibility is based on a schedule (e.g., only visible during the holiday season). In an embodiment, visibility is based on defined customer segments (e.g., only visible for male customers from Wyoming). In an embodiment, the customer segments are defined statically by the merchant, dynamically based on changing conditions, or based on rules themselves. For example, rules for customer segments can define customers from certain countries based on geolocation or an address, customers of a certain gender, customers who spent a certain amount of money with the merchant (which could be limited by time), customers who normally order a certain amount of products at one time, customers who visited the web site a certain number of times in a selected time period, customers who clicked on a particular advertisement, customers whose birthday is today, this week, or this month, customers who put a certain number of products in their online shopping basket but never bought them, or customers who make many product returns, and so on. Any rules defining customer segments or otherwise describing customers may be used.

Application server 104 communicates with web server 116. Web server 116 is a computer server that performs caching of web pages, delivery of web pages, load balancing, and secure socket layer (SSL) termination operations. In some embodiments, a plurality of application servers 104 can be coupled with web server 116, and a plurality of web servers 116 can be coupled with an application server. In an embodiment, web server 116 is operated by a CSP. Web server 116 is coupled to network 122 (such as the Internet, for example) for sending web pages to a customer's consumer device 126 as is well known in the art. Consumer device 126 is a computing device such as a personal computer (PC), smart phone, tablet computer, laptop computer, personal digital assistant (PDA), electronic book reader, smart television display, shopping kiosk, or other computing device for running web browser 124 to display web pages 110.

Web server 116 is coupled with web page cache 118. In an embodiment, web page cache 118 is a database in a cloud computing platform provided by the CSP or by the merchant. Web page cache 118 stores web pages for efficient delivery to consumer devices 126. In an embodiment, application server 104 may be combined with web server 116, and web page database 106 and web page cache 118 may be combined into one database.

In an embodiment, web page designer application 102 includes at least two operating modes. A first mode is called an edit mode, wherein a designer selects components to be a part of the web page and web page designer application 102 renders the edited page augmented with visual controls for editing the page (e.g., user interface (UI) controls for changing component properties, for moving components around on the page, etc.). A second mode is called a preview mode, wherein web page designer application renders the edited page without augmentation so the visual result of the changes is as close as possible (in the design and/or test environment) to what the customer will experience when viewing the page in the production environment (e.g., a live online storefront accessible to the public).

When a designer wants to preview the rendering of previously created page, the designer uses web page designer application 102 to configure the preview context. In an embodiment, the preview context includes a selected point in time (including date) and one or more customer segments. Web page designer application 102 applies the preview context, thus causing the visual display of the online storefront represented by the page 110 to refresh its rendering based on the current preview context, effectively simulating as if it were the selected point in time and as if the currently browsing customer is a member of the selected customer segments. (e.g., a previewing a female customer with gold shopping status on Black Friday, for example). This results in the applicable visibility rules 114 being applied as specified. In an embodiment, the preview context and associated visibility rules are applied for both edit mode and preview mode of operation resulting in a consistent prediction of what the page 110 will look like (e.g., visually representing which components 108 are shown or hidden given the preview context).

A page (acting as a root element of a tree) is comprised on multiple components (acting as nodes within the tree). The hierarchical structure results from merchant interaction with web page designer 102. A sample page with header, footer, an article and a promotional product carousel could look as follows from a structural point of view.

Figure 2:
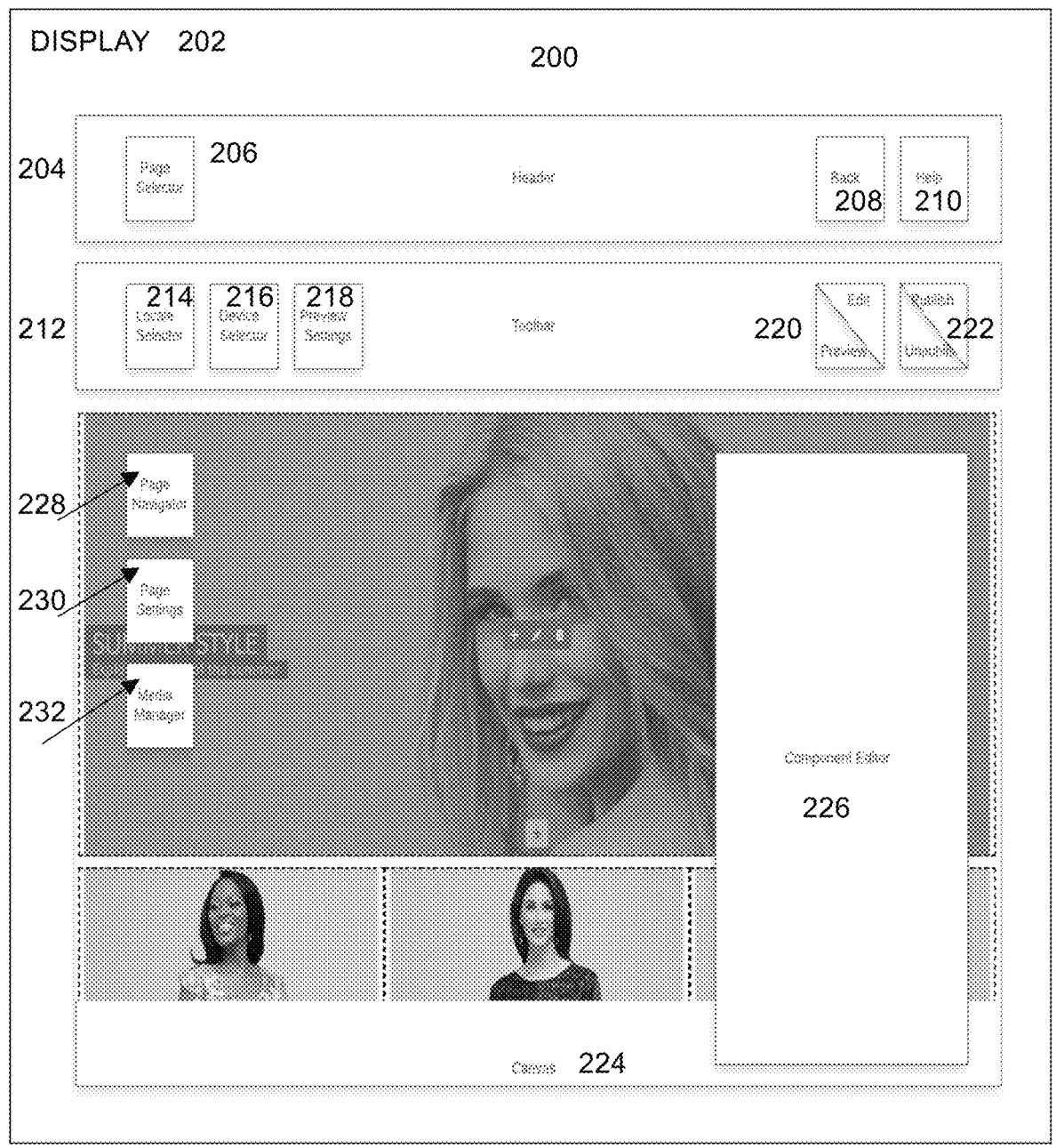
FIG. 2 illustrates an example of a user interface (UI) of a web page designer application according to an embodiment.

Advertising Campaign Landing Page
Header component
Article component
Product carousel component
Product tile component
Product tile component
Product tile component
Footer component FIG. 2 illustrates an example of user interface (UI) 200 of a web page designer application 102 rendered on a display 202 of a computing device according to an embodiment. During edit mode (e.g., page design time), UI 202 includes page header 204, which includes page selector button 206 for selecting a page to edit, back button 208 to exit from the web page designer application and help button 210 to select the display of documentation. UI 202 includes toolbar 212 for user controls. Toolbar 212 includes locale selector 214 for selecting the locale (e.g., language, country) for editing, device selector 216 for selecting a predefined device (e.g., desktop, mobile, tablet, etc.), preview settings 218 for configuring a preview context including customer segments and preview dates, edit/preview toggle 220 for toggling between edit mode and preview mode, and publish/unpublish toggle 222 for enabling/disabling the page for rendering in the live online storefront. When edit mode is selected, web page designer 102 augments the page rendering with UI controls to allow operations on the components that are part of the page. When in edit mode, web page designer does not allow the designer to browse/click within the page, but only allows the designer to use the UI controls described above. When in preview mode, web page designer renders the page without augmentation, and allows the designer to browse/click within the page to check behavioral effects within the page of selections.

When in edit mode, canvas 224 renders the page with components. The various settings that affect page/component rendering (e.g., locale, preview device, preview context) are applied. Visibility rules 114 as configured for the page and its components are also applied. Canvas 224 allows components of the page to be configured using component editor 226. Page navigator 228 visualizes the hierarchy of components that reside in the page in the shape of a tree view. Page settings 230 allows for changing various properties of the pages (e.g., page visibility rules). Media manager 232 allows for managing static assets (e.g., image upload).

In one version of web page designer 102, component editor 226 is designed, coded, and tested a priori by the developer of the web page designer application. This version includes a component editor 226 that provides capabilities for defining and managing component attributes typically used by merchants when designing web pages. There are limitations to this approach. The merchant may desire to define and manage new and/or different component attributes that are not known by the developer of the web page designer. These components and/or attributes may be specific to the business of the merchant, for example. The merchant may desire to define his or her own component attributes using a custom attribute editor designed and coded by a third-party custom attribute editor developer (other than the developer of the web page designer application). However, allowing custom editors designed and coded by others to be integrated into the web page designer application 102 may cause problems with the operation of the web page designer. For example, allowing third-party custom attribute editor developers to integrate their code into the web page designer without security controls may result in incorrect web pages or even crashing the web page designer.

Figure 3:
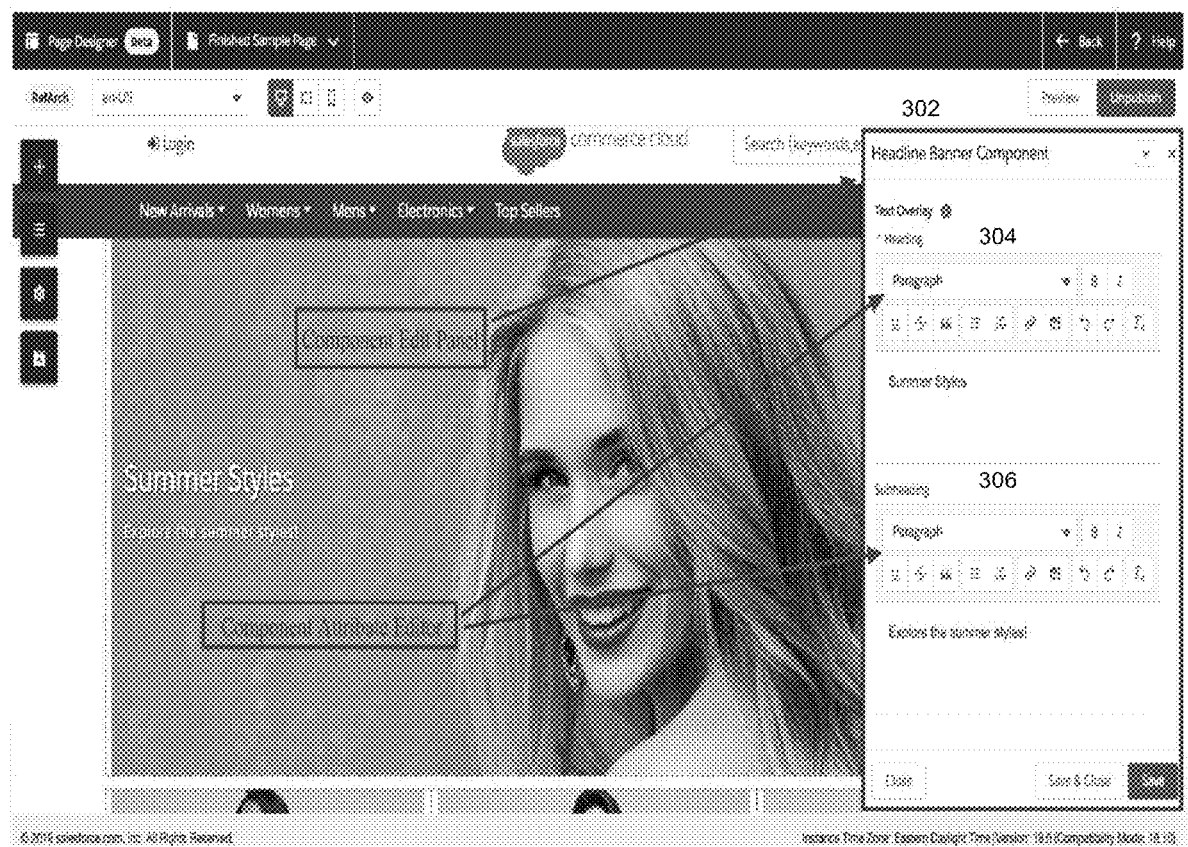
FIG. 3 illustrates an example of a user interface for a custom attribute editor according to an embodiment.

FIG. 3 illustrates an example of a user interface (UI) for a custom attribute editor according to an embodiment. Web page designer application 102 provides a component editor panel UI 302 displayed to the merchant so the merchant can select components, attributes, and attribute values. In one embodiment, a third-party component type developer integrates one or more custom attribute editors 304, 306 into component editor panel 302 of web page designer 102. In this example, the third-party component type developer integrates a custom attribute editor 304 to edit a heading component of the web page, and a custom attribute editor 306 to edit a subheading component of the web page. Each custom attribute editor 304, 306 is designed and coded by a third-party custom attribute editor developer to perform desired functionality in editing the web page.

Figure 4:
FIG. 4 illustrates an example of a user interface for a custom attribute editor according to an embodiment.

FIG. 4 illustrates an example of a user interface for a custom attribute editor according to an embodiment. In this example, custom attribute editor 404 includes the capability of selecting a logo image 406, placement of the logo image, setting the opacity of the logo image 408, and setting the width of the logo image 410. In this example, each of the component attributes 406 through 410 within custom attribute editor 404 are designed and coded by the third-party custom attribute editor developer, not the developer of web page designer 102. The example settings in the custom attribute editor box 404 (e.g., for selecting the logo 406 and its opacity 408 as well as pixel width 410), from a page designer attribute point of view is just one attribute. The additional settings for player controls and auto play are two more example attributes. The custom attribute editor 404 for the first player controls however codes the custom attribute editor in a way that the one attribute it relates to is structured as a composite of multiple sub properties (e.g., logo, opacity, pixel width). So effectively from a data point of view the custom attribute editor includes settings for logo selection 406, opacity selection 408m and pixel width 410, and component edit panel 420 includes the attribute configured by custom attribute editor 404, play controls, and autoplay. In embodiments, custom attribute editor 404 is written by the third-party custom attribute editor developer and play controls and autoplay served through a native attribute editor are written by the third-party component type developer. The overall definition of what component edit panel 402 consists of (that is, the component type definition describing which attributes are to be served to the merchant and which UIs for types of attribute editors to use for each of them, is written by the third-party custom attribute editor developer (such as using a j son descriptor).

Embodiments of the present invention execute the custom attribute editor within a sandbox controlled by web page designer 102. For communication from the web page designer into the sandbox (and vice versa), in one embodiment a pub/sub channel messaging function is used. The channel messaging function allows two separate scripts running in different browsing contexts attached to the same document to communicate directly, passing messages between one another through two-way channels (or pipes)

with a port at each end. This messaging allows the web page designer 102 to pass values, configuration settings, etc. into the sandboxed custom attribute editor 402 and allows the sandboxed custom attribute editor to communicate back to web page designer 102 in a controlled manner (for example, to inform the web page designer that a value selection changed).

Due to this isolation any code related issue of the sandboxed custom attribute editor 402 (exceptions, security violations, and so on) cannot escape from the sandbox into the web page designer. In embodiments of the present invention, this approach not only supports the client (e.g., browser) side capabilities but also provides hooks into server-side processing of the web page designer. The client-side web page designer application is backed by server-side services (to store and retrieve data, apply business logic, etc.). Custom attribute editors are tied into the present architecture by allowing the server-side web page designer application to assemble resources (such JavaScripts and cascading style sheets (CSS)) and configuration values required for operation of the client-side web page designer application. This is supported through both definition (within JavaScript Object Notation (JSON) files, e.g., configuring which CSS files should be served by the server to the client side sandbox) and server side scripting (within JavaScript (JS) files, e.g., readout of data via any kind of platform or third party service as well as dynamic assembly of required resources).

Web page designer 102 supports many component attributes. In one embodiment, a custom component attribute is provided that can be managed by custom attribute editor 402. In an embodiment, a custom component attribute is described by a string enclosed in braces that represents a JSON object. Table I is an example of component attribute types.

TABLE I

| Component Attribute Type | Attribute Semantics | Visual Editor UI Control |
|---|---|---|
| boolean | boolean | Check box |
| category | String representing a catalog category ID | Category picker |
| custom | String enclosed in braces that represents a JSON object | Customer editor |
| enum | Enumeration of string or integer values | Select box |
| file | String representing a file path within a library | File picker |
| image | String representing a configurable image JSON object | Image picker |
| integer | integer | Input field |
| markup | String representing HTML markup | Rich text editor |
| page | String representing page ID | Page picker |
| product | String representing product stock keeping unit (SKU) | Product picker |
| string | String | Input field |
| text | String | Text area |
| url | String representing a uniform resource locator (URL) | URL picker |

In embodiments of the present invention, implementation of custom attribute editors 402 for custom component attributes include declaration and logic for server-side and client-side portions of web page designer 102. On the server side, web page designer 102 includes declaration of client-side resources such as CSS, scripts, etc., logic for initialization and validation, and configuration of custom attribute editors. On the client side, web page designer 102 includes logic for initialization and validation, visualization of the custom attribute editors, and data transfers to web page database 106.

Figure 5:
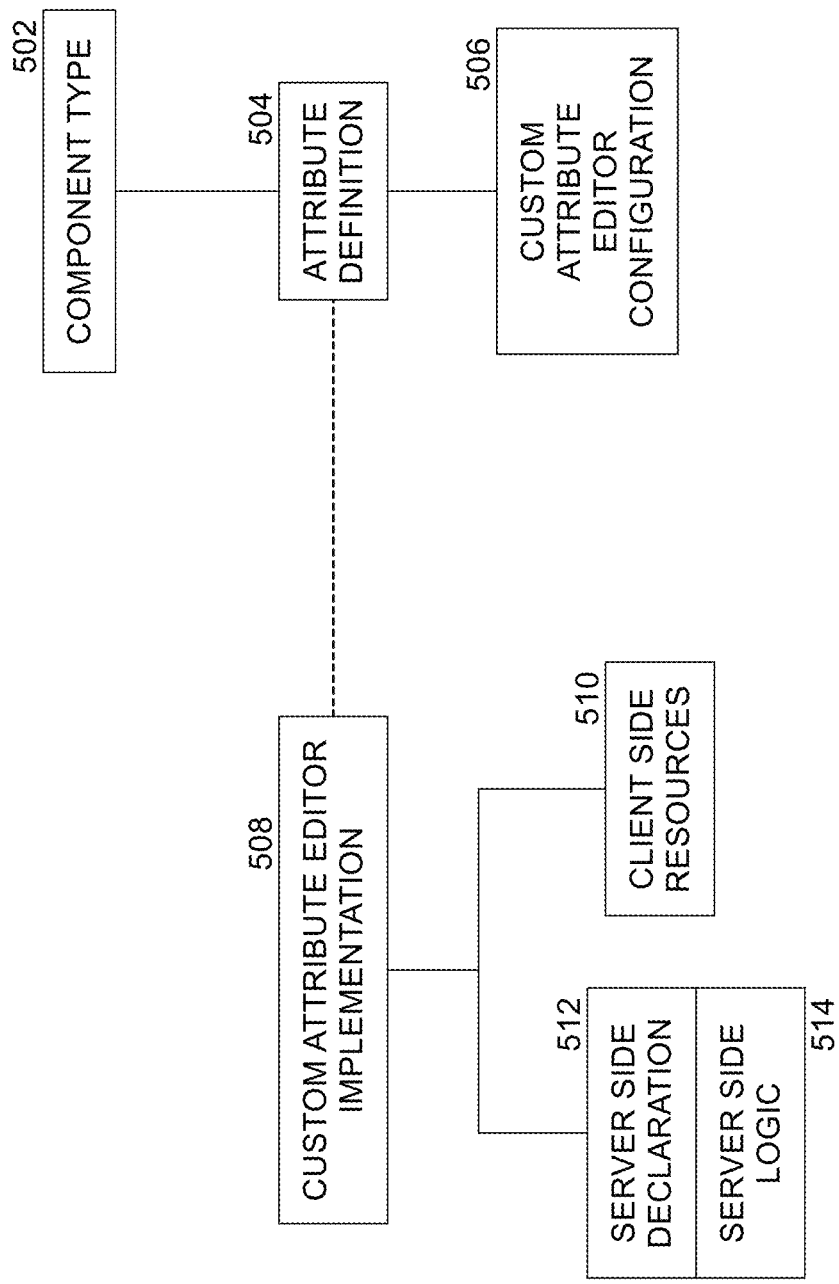
FIG. 5 illustrates an example of a custom attribute editor hierarchy according to an embodiment.

FIG. 5 illustrates an example of a custom attribute editor hierarchy 500 according to an embodiment. Web page designer 102 supports a plurality of component types 502. Each component type (defining a component edit panel) is defined by a plurality of attribute definitions 504 (as described above in Table I). When a component type includes custom attributes available for selection by the merchant, the third-party custom attribute developer provides a custom attribute editor configuration 506 to web page designer 102. For each custom attribute, a custom attribute editor definition 508 is provided by the third-party custom attribute developer. Each custom attribute editor definition 508 includes server-side declaration 512 and server-side logic 514, and client-side resources 510. In embodiments of the present invention, custom attribute editors may be nested, whereby a parent custom attribute editor can call a child custom attribute editor. This results in nested sandboxes, with each custom attribute editor executing in its own sandbox.

Figure 6:
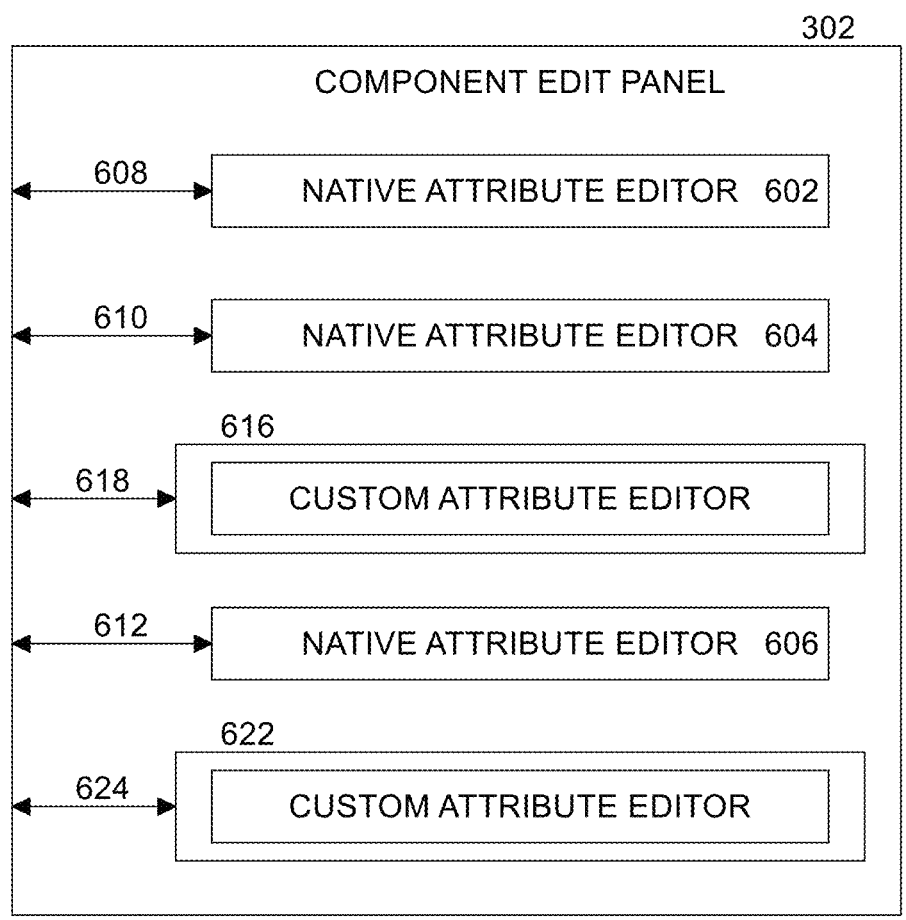
FIG. 6 illustrates an example of a component edit panel according to an embodiment.

FIG. 6 illustrates an example of a component edit panel 302 according to an embodiment. Component edit panel 302 may include one or more attribute editors. For example, component edit panel 302 may include native attribute editors 602, 604, and 606. In this case, native refers to a component attribute provided by the web page designer (such any one of the attributes in Table I other than the custom component attribute). Native attributes communicate value changes to and from component edit panel 302 via internal calls 608, 610, and 612, respectively. Native attribute editors 602, 604, and 606 are not contained in sandboxes. Component edit panel 302 may include one or more custom attribute editors 614 and 620, each contained within its own sandbox 616, 622, respectively. Custom code provided by the third-party custom attribute editor developer that implement custom attribute editors 614, 620 is isolated by and from component edit panel 302 (part of web page designer 102) so that a custom attribute editor can act freely within its own sandbox. This deters a custom attribute editor from imposing any security issue on component edit panel 302 or other attribute editors (either native or custom). Custom attribute editors 614, 620 communicate value changes to and from their own isolation layer (e.g., sandbox), which is owned by component edit panel 302 through pub/sub message channels 618, 624, respectively. The sandbox itself communicates the value changes to and from the component edit panel just as native attributes do.

Figure 7:
FIG. 7 illustrates an example of a component edit panel according to an embodiment.

FIG. 7 illustrates an example of a component edit panel 302 according to an embodiment. In some scenarios, custom attribute editors need to use more space on the display to visual their UI for the merchant/user. In these scenarios, embodiments of the present invention provide for nesting of custom attribute editors, with each layer of a custom attribute editor being isolated in its own sandbox. For example, custom attribute editor 614 operating in sandbox 616 launches a child sandbox 628 containing custom attribute editor 626. Custom attribute editor 614 accumulates and transforms values received from custom attribute editor 626 over a pub/sub message channel (not shown) within sandbox 616 and forwards the values to component edit panel 302 over pub/sub message channel 618.

Figure 8:
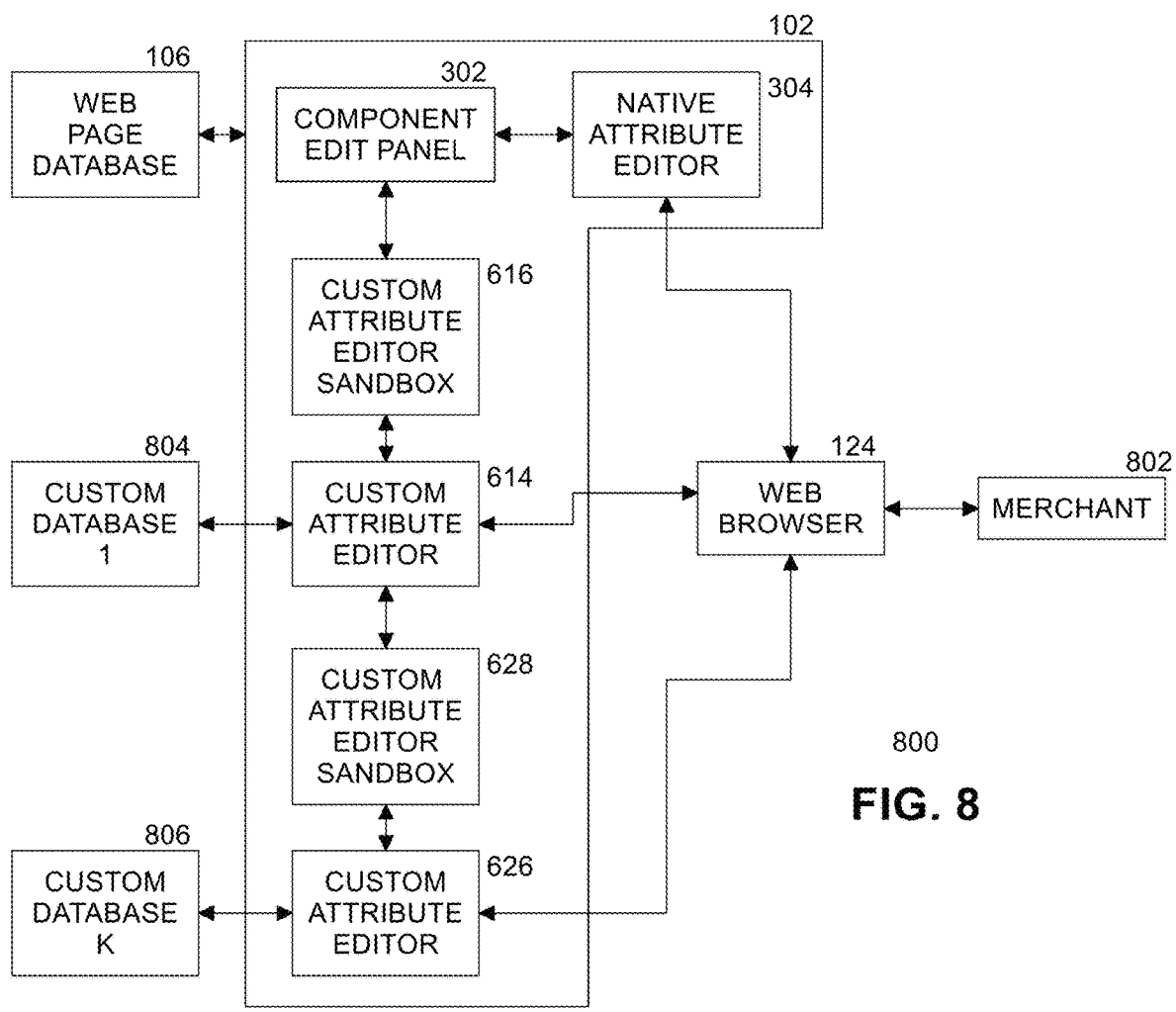
FIG. 8 illustrates an example of an arrangement of databases and a web page designer application according to an embodiment.

FIG. 8 illustrates an example of an arrangement of databases 106, 804, 806 and a web page designer application 102 according to an embodiment. Merchant 802 uses web browser 124 to interact with web page designer 102. Web page designer 102 includes component edit panel 302, which includes one or more native attribute editors 304. Native attributes are defined by the implementation of web page designer 102 and values for those attributes are stored in web page database 106. In embodiments of the present invention, one or more custom attribute editors 614 may be designed and developed by the third-party custom attribute developer (not shown) to provide component attributes not "hard-coded" into web page designer 102. Each custom attribute editor 614 is isolated in a custom attribute editor sandbox 616. A custom attribute editor 614 may optionally get data from and store data to a custom database 1 804 provided by the third-party custom attribute editor developer.

A custom attribute editor may optionally pull in data from external data sources. Data is stored for the attribute this custom attribute editor corresponds to (such as a previously selected value, in case the merchant has edited that component/attribute already). This data value flows in from the component edit panel (as the web page designer application is responsible for storing and retrieving the value per attribute) through the message channel into the custom editor sandbox and thus is made available for the custom attribute editor.

Custom attribute editor 614 may launch one or more child custom attribute editors 626. Each custom attribute editor 626 is isolated in a custom attribute editor sandbox 628. A custom attribute editor 626 may optionally get data from and store data to a custom database K 806 provided by a third-party custom attribute editor developer (which may or may not be the developer who provided custom attribute editor 614, custom database 1 804, and/or custom attribute editor 626). Thus, a nested hierarchy of custom attribute editors and associated sandboxes may be formed by merchant 802 as required.

In an embodiment, on the client side of web page designer, an implementation of a custom attribute editor can validate any merchant/user input and provide direct visual feedback to the merchant/user as part of the custom attribute editor UI. This validation is also applied to any nested custom attribute editor. On the server side of web page designer, an implementation of a custom attribute editor can validate any final input value so that any malicious transmitted value can be rejected and messaged as needed. A composition of components realized through the use of nested custom attribute editors is handled as an aggregate validation on the top level (root) custom attribute editor.

During operation of web page designer 102, the merchant (e.g., the user of the design tool) enters user input selections using known methods (mouse clicks, touch screen data entry, touch pad entry, voice input, etc.). In response, web page designer 102 displays and/or re-displays a graphical user interface (GUI) to the designer. The GUI shows a representation of the web page being designed and/or previewed. This allows the merchant to observe the GUI and make further changes as necessary.

Figure 9:
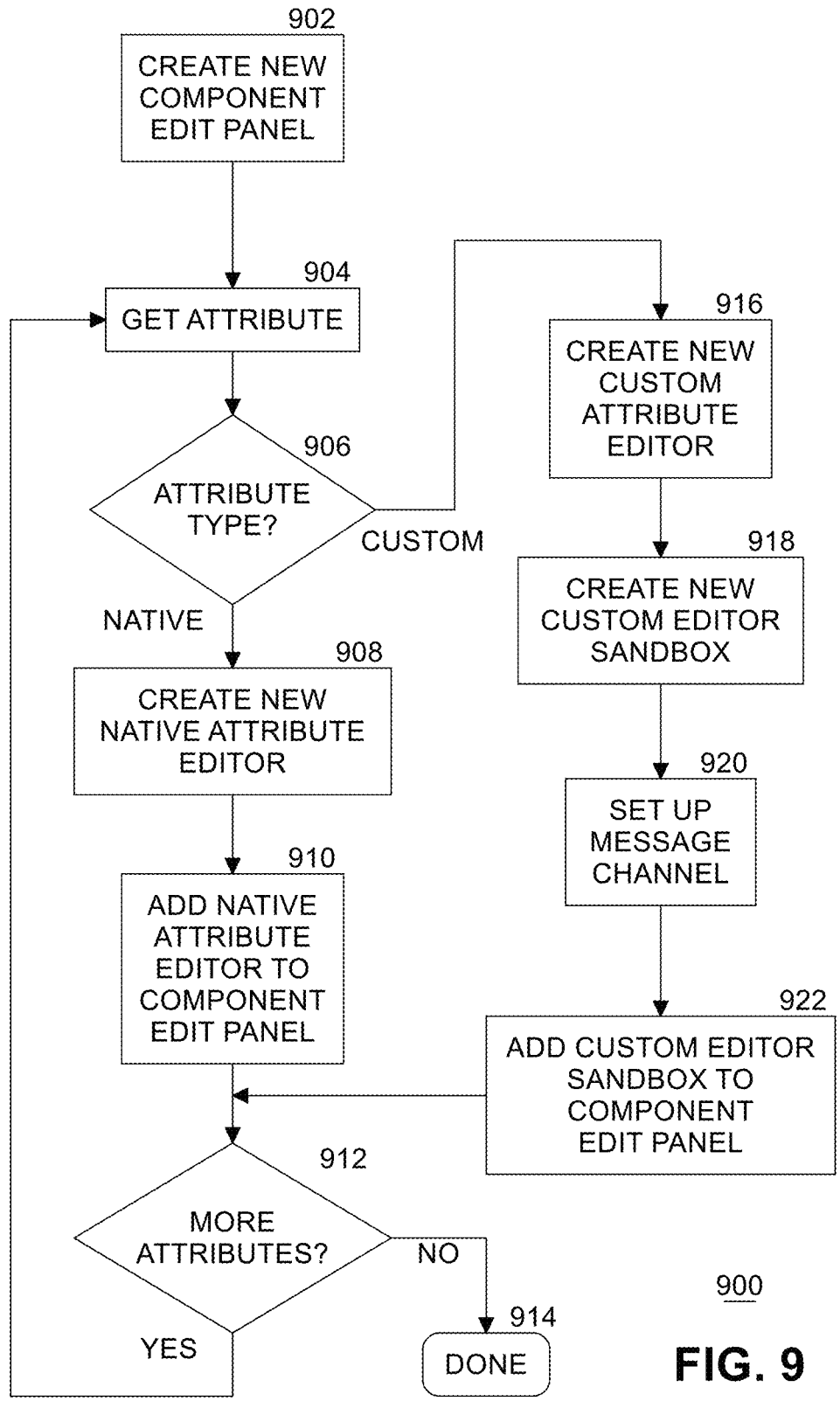
FIG. 9 is a flow diagram of component edit panel initialization processing by the web page designer application according to an embodiment.

FIG. 9 is a flow diagram of component edit panel initialization processing 900 by the web page designer application according to an embodiment. In an embodiment, component edit panel initialization may be performed when web page designer 102 is initialized. At block 902, web page designer creates a new component edit panel 302. At block 904, web page designer gets a first attribute of the newly created component edit panel 302. If the type of the attribute is native at block 906 (indicating that the attribute editor to be created is for an editor defined by the provider of the web page designer), then web page designer creates a new native attribute editor (such as native attribute editor 602) for the current attribute at block 908. At block 910, web page designer adds the new native attribute editor 602 to component edit panel 302. If there are more attributes to process for this component edit panel at block 912, then processing continues with block 904. Otherwise processing ends at block 914.

If the type of attribute is custom at block 906 (indicating that the attribute editor to be created is for an editor defined by the client or customer of the web page designer provider), then web page designer creates a new custom attribute editor (such as custom attribute editor 614) for the current attribute at block 916. At block 918, web page designer creates a new custom editor sandbox 616 for the newly created custom attribute editor 614. The custom editor sandbox isolates the custom attribute editor from native attribute editors (such as native attribute editors 602, 604, and 606), other sandboxes (such as custom editor sandbox 622), and other parts of web page designer 102 (such as page selector 206, back button 208, help button 210, locale selector 214, device selector 216, preview settings 218, edit/preview button 220, publish button 222, page navigator 228, page settings 230, and media manager 232, and so on). At block 920, web page designer sets up a message channel 618 for the new custom attribute editor 614 through the new custom editor sandbox 616. At block 922, web page designer adds the customer editor sandbox 616 to the component edit panel 302. Processing continues with the next attribute (if any) at block 912. After processing is complete, component edit panel 302 is returned to the caller.

Example pseudo-code for component edit panel initialization processing 900 is shown below.
© 2019 Salesforce, Inc.
—initialize the component edit panel with corresponding editor per attribute
PROCEDURE Init_Component_Edit_Panel(component) {
   —setup the basic panel that holds all attributes
   VAR ComponentEditPanel=new ComponentEditPanel (component);
   —every attribute gets its corresponding UI, either native or controlled by custom code
   FOR EACH attribute IN component.attributes
   VAR attributeUI;
   IF attribute:native THEN
     attributeUI=new NativeEditor(attribute.data);
   ELSIF attribute:custom THEN
     VAR attributeCustomEditor=new CustomEditor(attribute.editorDefinition);
     VAR attributeCustomEditorSandbox=Create_Custom_ Editor_Sandbox(customEditor);
     attributeCustomEditorSandbox.sendMessage(attributeCustomEditor, attribute.data);
     —communicate initial data through message channel into custom editor
     attributeUI=attributeCustomEditorSandbox;
   END
   ComponentEditPanel[component].ui=editor;
   END
   RETURN ComponentEditPanel;
}

Figure 10:
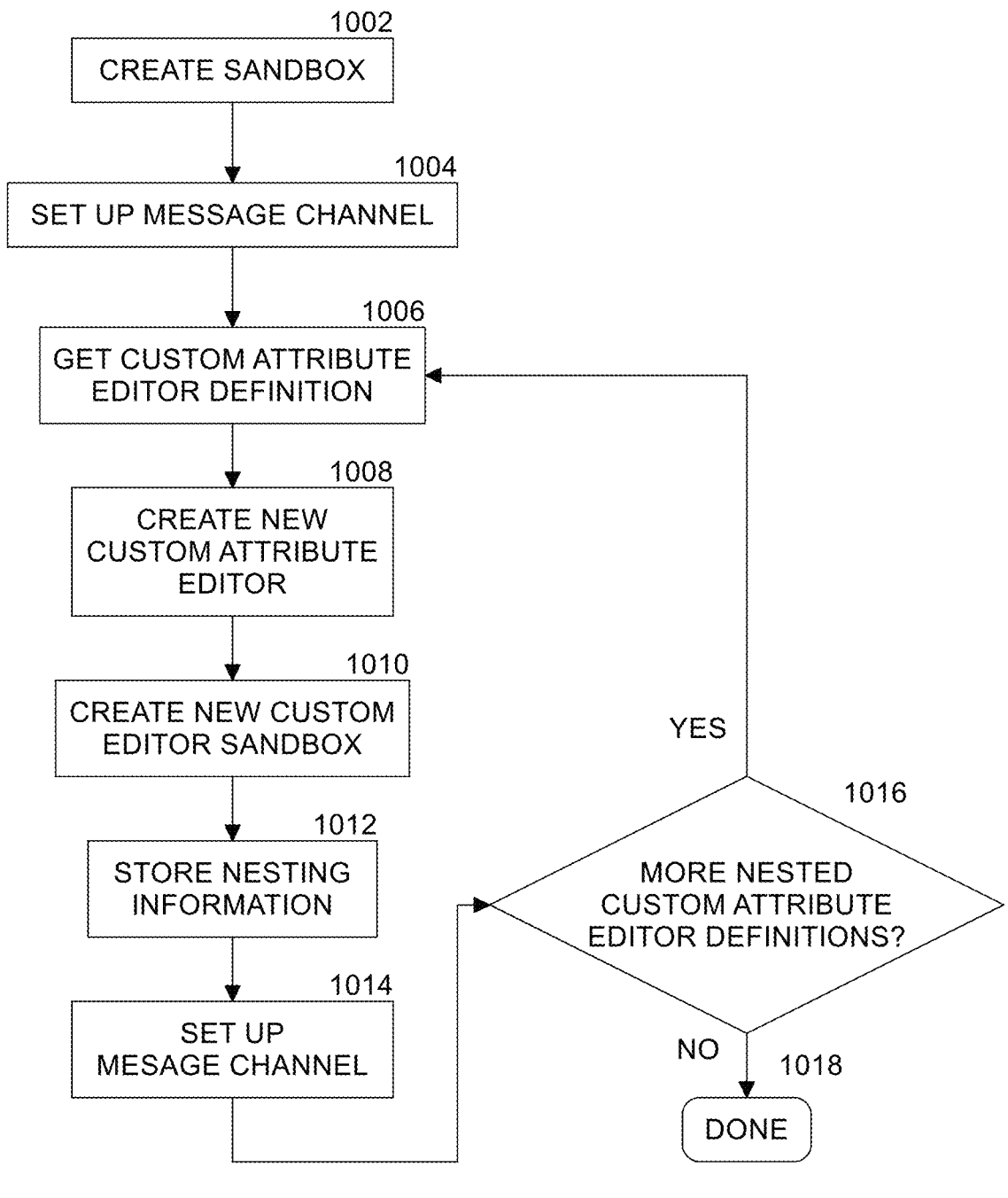
FIG. 10 is a flow diagram of custom editor sandbox creation processing by the web page designer application according to an embodiment.

FIG. 10 is a flow diagram of custom editor sandbox creation processing 1000 by the web page designer application according to an embodiment. In an embodiment, this processing is representative of block 918 of FIG. 9. At block 1002, web page designer creates and/or instantiates a new sandbox 616 for a custom attribute editor 614. At block 1004, web page designer 102 sets up a message channel 618 to custom attribute editor 614 through custom editor sandbox 616. At block 1006, web page designer gets a custom attribute editor definition. At block 1008, web page designer creates a new custom attribute editor 626 based at least in part on the current custom attribute editor definition. At block 1010, web page designer recursively processes nested new custom attribute editors and associated new sandboxes by creating a new custom editor sandbox for the new custom attribute editor. At block 1012, nesting information about the nested sandboxes and custom attribute editors is stored. At block 104, web page designer sets up a message channel (e.g., channel 628) between a custom attribute editor 614 and a nested and sandboxed custom attribute editor 626. At block 106, if there are more nested custom attribute editor definitions to process, then processing continues with block 1006. If not, processing ends at block 1018 and a custom editor sandbox is returned to the caller.

Example pseudo-code for custom editor sandbox creation processing is shown below.
© 2019 Salesforce, Inc.
—create custom editor including all nested breakouts in isolation sandbox
PROCEDURE Create_Custom_Editor_Sandbox(customEditor) {
  —create custom editor sandbox for the given custom editor and
  —establish messaging between the two
  VAR customEditorSandbox=new CustomEditorSandbox(customEditor);
  customEditorSandbox.establishMessageChannelTo(customEditor);
  —recursively wire breakouts (nested sandboxes)
  FOR EACH breakout IN customEditor.definition
    —create custom editor including sandbox per breakout
    VAR breakoutCustomEditor=new CustomEditor(breakout.definition);
    VAR breakoutCustomEditorSandbox=Create_Custom_Editor_Sandbox(breakoutCustomEditor);
    —recursive call
    customEditorSandbox.breakouts[breakout.id]=breakoutCustomEditorSandbox;
    customEditorSandbox.establishMessageChannelTo(breakoutCustomEditorSandbox);
  END
RETURN customEditorSandbox;
}

One or more parts of the above implementations may include software and/or a combination of software and hardware. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), Flash memory, phase change memory, solid state drives (SSDs)) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists the code/data even when the electronic device is turned off (when power is removed), and the electronic device copies that part of the code that is to be executed by the processor(s) of that electronic device from the non-volatile memory into the volatile memory of that electronic device during operation because volatile memory typically has faster read/write times. As another example, an electronic device may include a non-volatile memory (e.g., phase change memory) to store the code/data when the electronic device is turned off, and that same non-volatile memory has sufficiently fast read/write times such that, rather than copying the part of the code to be executed into volatile memory, the code/data may be provided directly to the processor(s) (e.g., loaded into a cache of the processor(s)); in other words, this non-volatile memory operates as both long term storage and main memory, and thus the electronic device may have no or only a small amount of DRAM for main memory. Typical electronic devices also include a set of one or more physical network interface(s) to establish network connections (to transmit and/or receive code and/or data using propagating signals) with other electronic devices.

Figure 11:
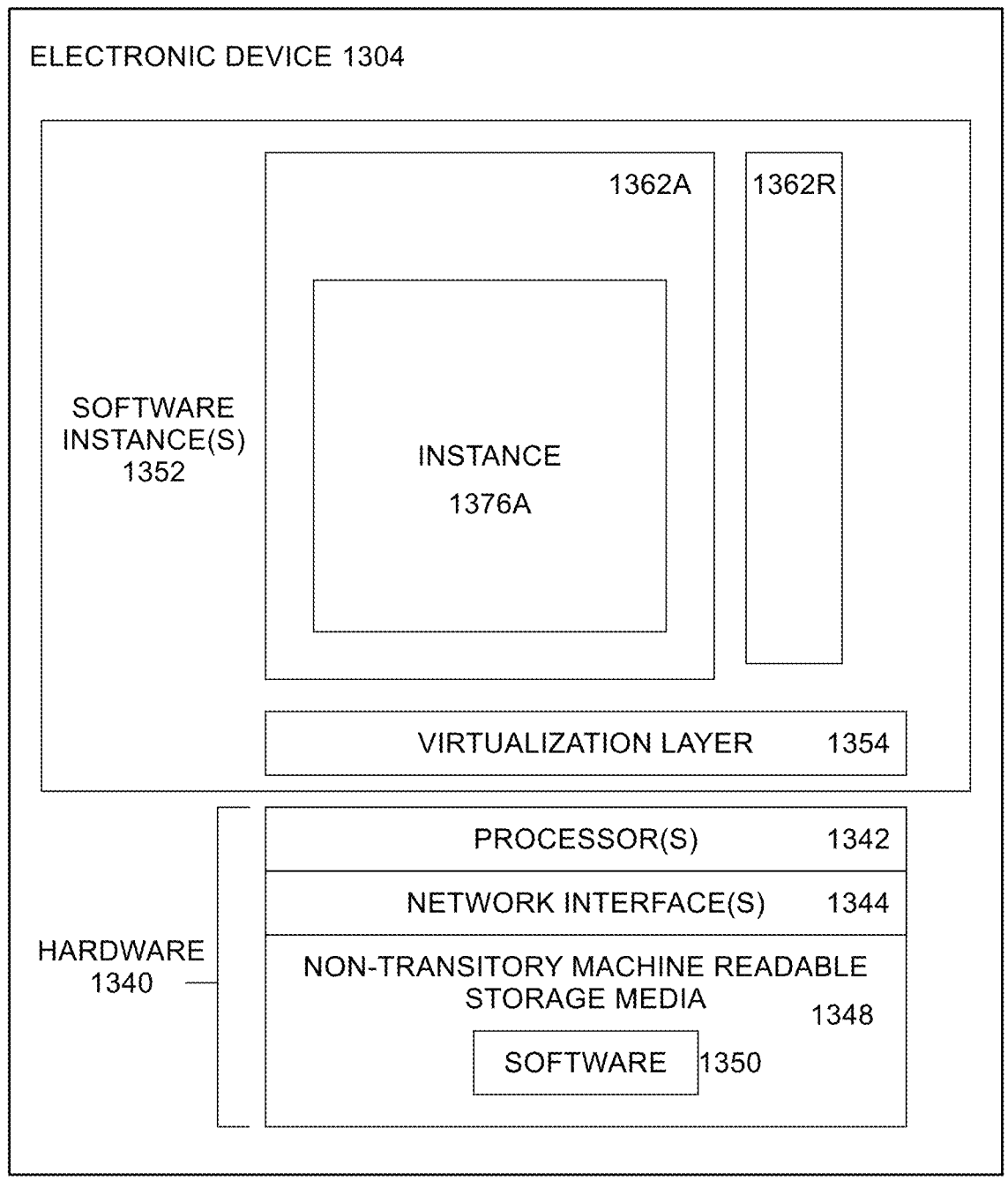
FIG. 11 illustrates an electronic device according to some implementations.

FIG. 11 illustrates an electronic device 1304 according to some implementations. FIG. 11 includes hardware 1340 comprising a set of one or more processor(s) 1342, a set or one or more network interfaces 1344 (wireless and/or wired), and non-transitory machine-readable storage media 148 having stored therein software 1350. Each of the previously described application server 104, web server 116, web page designer application 102, and/or consumer device 126 may be implemented in one or more electronic devices 1304. In one implementation, each of consumer devices is implemented in a separate one of the electronic devices 1304 (e.g., in an end user electronic device operated by an end user; in which case, the software 1350 in each such end user electronic device includes the software to implement one of the end user clients, including software to interface with a cloud computing service (e.g., an application programming interface (API), a web browser, a native client, a portal, a command-line interface, etc.)) and each of application server 104, web page designer 102, and web server 116 is implemented in a separate set of one or more of the electronic devices 1304 (in which case, the software 1350 is the software to implement web page design and delivery of application server 104 (including web page designer 102) and web server 116; in operation, the end user electronic devices and the electronic device(s) implementing the cloud computing system containing application server 104 and web server 116 would be commutatively coupled (e.g., by a network) and would establish between them connections for requesting and providing cloud computing services. In an embodiment, application server 104 and web server 116 may be implemented in the same electronic device. Other configurations of electronic devices may be used in other implementations.

In electronic devices that use compute virtualization, the processor(s) 1342 typically execute software to instantiate a virtualization layer 1354 and software container(s) 1362A-R (e.g., with operating system-level virtualization, the virtualization layer 1354 represents the kernel of an operating system (or a shim executing on a base operating system) that allows for the creation of multiple software containers 1362A-R (representing separate user space instances and also called virtualization engines, virtual private servers, or jails) that may each be used to execute a set of one or more applications; with full virtualization, the virtualization layer 1354 represents a hypervisor (sometimes referred to as a virtual machine monitor (VMM)) or a hypervisor executing on top of a host operating system (OS), and the software containers 1362A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 1350 (illustrated as instance 1376A) is executed within the software container 1362A on the virtualization layer 1354. In electronic devices where compute virtualization is not used, the instance 1376A on top of a host operating system is executed on the "bare metal" electronic device 1304. The instantiation of the instance 1376A, as well as the virtualization layer 1354 and software containers 1362A-R if implemented, are collectively referred to as software instance(s) 1352.

Alternative implementations of an electronic device may have numerous variations from that described above. For example, customized hardware and/or accelerators might also be used in an electronic device.

Figure 12:
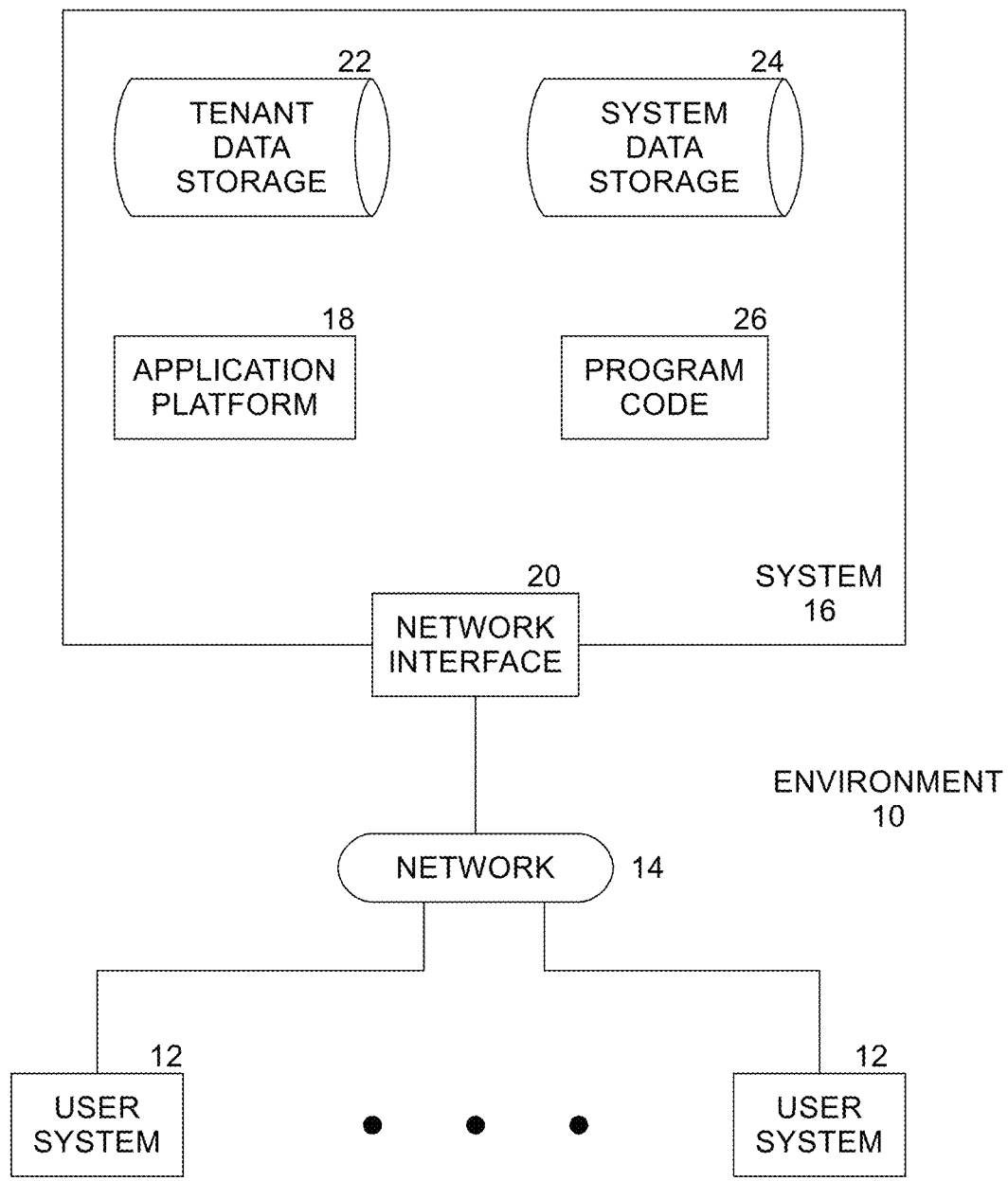
FIG. 12 shows a block diagram of an example of a computing environment in which the web page designer application including a timeline may be used in accordance with some implementations.

FIG. 12 shows a block diagram of an example of an environment 10 in which the present web page design and delivery operations may be used in accordance with some implementations. Computing environment 10 may include one or more user systems 12, network 14, and system 16, where system 16 includes application platform 18, network interface 20, tenant data storage 22, system data storage 24, and program code 26. In other implementations, environment 10 may not have all of these components and/or may have other components instead of, or in addition to, those listed above.

The system 16 includes hardware and software to implement application server 104, web page designer 102, and/or web server 116 and/or web page cache 118. User systems 12 are electronic devices used by one or more users (such as consumer devices 126) that subscribe to services (e.g., web page delivery) provided by the cloud computing services implemented by the system 16. User systems 12 might interact via a network 14 with the system 16. Further, in one implementation, the system 16 is a multi-tenant cloud computing architecture supporting multiple services, such as software as a service (SaaS) (e.g., customer relationship management (CRM) service provided by Salesforce.com, Inc.), platform as a service (PaaS) (e.g., execution runtime, database, application development tools; such as Force.com®, Heroku™, and Database.com™ by Salesforce.com, Inc.), and/or infrastructure as a service (IaaS) (virtual machines, servers, storage). In some implementations, such a platform as a service allows for the creation, management and execution of one or more applications developed by the provider of the service, vendors accessing the service via user systems 12, or third-party application developers accessing the system 12. The system 16 may utilize methods for providing web page design and delivery, as described above. This allows for the system 16 to provide web page delivery in an efficient and scalable manner.

Network 14 is any network or combination of networks of devices that communicate with one another. For example, network 14 can be any one or any combination of a local area network (LAN), wide area network (WAN), telephone network, wireless network, point-to-point network, star network, token ring network, hub network, or other appropriate configuration. Network 14 can include a Transfer Control Protocol and Internet Protocol (TCP/IP) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

Each user system 12 is an end user electronic device, such as a desktop personal computer, workstation, laptop, personal digital assistant (PDA), tablet computer, cell phone, etc. Each user system 12 typically includes one or more user interface devices, such as a keyboard, a mouse, trackball, touch pad, touch screen, pen or the like, for interacting with a graphical user interface (GUI) provided on a display (e.g., a monitor screen, liquid crystal display (LCD), etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. User systems 12 might communicate with system 16 using TCP/IP and, at a higher network level, use other common Internet protocols to communicate, such as hypertext transport protocol (HTTP), file transfer protocol (FTP), Andrew file system (AFS), wireless application protocol (WAP), etc. In an example where HTTP is used, user system 12 might include an HTTP client commonly referred to as a "browser" for sending and receiving HTTP signals to and from a server at system 16 allowing a user of user system 12 to access, process and view information, pages and applications available to it from system 16 over network 14. Such a server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. However, other alternative configurations may be used instead.

In one implementation, tenant data storage 22 is a multi-tenant database management system (DBMS). In a typical multi-tenant DBMS, a single instance of software may be used to store data from multiple vendors (also known as tenants) and each vendor is provided with a dedicated share of the software instance. The term "data record" generally refers to a data entity created by or on behalf of a vendor. A data record is comprised of a set of fields defined within a database. A database can be viewed as a collection of database objects, such as a set of logical tables, containing data fitted into predefined categories. A "table" is one representation of a database object and may be used herein to simplify the conceptual description of database objects. In the context of a relational database, each relational database table generally contains one or more data categories logically arranged as columns according to a schema, where the columns of the relational database table are different ones of the fields from the plurality of data records, and where each row of the relational database table are different ones of a plurality data records and contains an instance of data for each category defined by the fields. In some implementations of a cloud database (a database that runs on a cloud platform and access to which is provided as a database service), each database object contains a plurality of data records having fields, where identifiers are used instead of database keys, and wherein relationships are used instead of foreign keys. Regardless, by way of example, a data record can be for a business partner or potential business partner of a vendor, and can include information describing an entire company, subsidiaries, and/or contacts at the company. As another example, a data record can be for a project that a vendor is working on, such as an opportunity (e.g., a possible sale) with an existing partner, or a project that the vendor is trying to get. As another example, a customer-relationship management (CRM) database may include: 1) a database object that describes a customer with fields for basic contact information such as name, address, phone number, fax number, etc.; and 2) another database object might describe a purchase order, including fields for information such as customer, product, sale price, date, etc.

In some implementations, the tenant data storage 22 includes one or more databases storing the vendor/tenant data (such as information about the vendor's customers/users, information about the vendor's products/services, marketing materials. Thus, in operation, a vendor, through a user system 12, causes the vendor/tenant data to be stored in the tenant data storage 22. In some implementations, a vendor can access system 16 through user system 12 to access its data stored in tenant data storage 22.

In some implementations, system data storage 24 stores system data 25 accessible to system 16 and possibly multiple tenants, while program code 26 (e.g., a runtime engine that materializes application data from metadata; that is, there is a clear separation of the compiled runtime engine (also known as the system kernel), tenant data, and the metadata that describes each application, which make it possible to independently update the system kernel and tenant-specific applications and schemas, with virtually no risk of one affecting the others) for implementing various functions of system 16. In such implementations, the tenant data storage 22, which is a multi-tenant database management system (DBMS), manages one or more databases storing the vendor/tenant data and vendor/tenant application metadata. The tenant data and the system data may be stored in various databases, such as one or more Oracle® databases.

In one implementation, application platform 18 includes an application setup mechanism that supports application developers' creation and management of applications (such as web page designer 102), which may be saved as metadata into tenant data storage by save routines. Invocations to such applications may be coded using procedural language for structured query language (PL/SQL) that provides a programming language style interface. Invocations to applications may be detected by one or more system processes, which manage retrieving application metadata for the subscriber making the invocation and executing the metadata as an application in a virtual machine.

In certain implementations, one or more servers of system 16 is configured to handle requests for any user associated with any organization that is a tenant. Because it is desirable to be able to add and remove servers from the server pool at any time for any reason, there is preferably no server affinity for a user and/or organization to a specific server. In one implementation, therefore, an interface system implementing a load balancing function is communicably coupled between the servers of system 16 and the user systems 12 to distribute requests to the servers. In one implementation, the load balancer uses a least connections algorithm to route user requests to the servers. Other examples of load balancing algorithms, such as round robin and observed response time, also can be used. For example, in certain implementations, three consecutive requests from the same user could hit three different servers, and three requests from different users could hit the same server. In this manner, by way of example, system 16 is multi-tenant, wherein system 16 handles storage of, and access to, different database objects, data and applications across disparate users and organizations.

In certain implementations, user systems 12 (which may be client systems) communicate with the servers of system 16 to request and update system-level and tenant-level data from system 16 that may involve sending one or more queries to tenant data storage 22 and/or system data storage 24. In one implementation of system 16, a server in system 16 automatically generates one or more SQL statements (e.g., one or more SQL queries) that are designed to access the desired information. System data storage 24 may generate query plans to access the requested data from the database.

In some multi-tenant database systems, tenants may be allowed to create and store custom objects, or they may be allowed to customize standard entities or objects, for example by creating custom fields for standard objects, including custom index fields. In certain implementations, for example, all data records of a custom data object are stored in a single multi-tenant physical table, which may contain multiple logical database objects per organization. It is transparent to customers of the system 16 that their multiple database objects are in fact stored in one large table or that their data may be stored in the same table as the data of other customers.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue implementation.

References in the specification to "one implementation," "an implementation," "an example implementation," "some implementations," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A computing device comprising:
   one or more processors; and
   a non-transitory machine-readable storage medium having instructions stored therein, which when executed by the one or more processors, causes the computing device to:
   create a component edit panel for a user interface of a web page designer application;
   create a first untrusted custom attribute editor;
   create a first custom editor sandbox to prevent an error occurring in the first untrusted custom attribute editor from affecting other parts of the web page designer application;
   set up a first message channel to the first untrusted custom attribute editor through the first custom editor sandbox;
   add the first custom editor sandbox to the component edit panel;
   create one or more native attribute editors; and
   add the one or more native attribute editors to the component edit panel;
   wherein the first custom untrusted attribute editor is isolated from the one or more native attribute editors by the first custom editor sandbox.

2. The computing device of claim 1, further comprising instructions, which when executed by the one or more processors, cause the computing device to:
   get a custom attribute editor definition;
   create a second untrusted custom attribute editor based at least in part on the custom attribute editor definition;
   create a second custom editor sandbox nested within the first custom editor sandbox to isolate the second untrusted custom attribute editor from the first untrusted custom attribute editor and other parts of the web page designer application; and
   set up a second message channel to the second untrusted custom attribute editor through the second custom editor sandbox.

3. The computing device of claim 2, further comprising instructions, which when executed by the one or more processors, cause the computing device to:
   recursively create nested one or more untrusted custom attribute editors and associated custom editor sandboxes based on custom attribute editor definitions.

4. The computing device of claim 1, wherein the component edit panel provides the user interface of the web page designer application for a merchant to configure one or more custom attributes of a component of a web page.

5. The computing device of claim 1, wherein the first untrusted custom attribute editor is provided to the web page designer application by a third-party custom attribute editor developer.

6. The computing device of claim 1, wherein the first message channel is to securely communicate information from the web page designer application to the first untrusted custom attribute editor within the first custom editor sandbox, and from the first untrusted custom attribute editor within the first custom editor sandbox to the web page designer application.

7. The computing device of claim 1, further comprising instructions, which when executed by the one or more processors, cause the computing device to:
   get a first custom attribute definition from a first custom database; and
   get one or more native attribute definitions from a database of the web page designer application.

8. A computer-implemented method comprising:
   creating a component edit panel for a user interface of a web page designer application;
   creating a first untrusted custom attribute editor;
   creating a first custom editor sandbox to prevent an error occurring in the first untrusted custom attribute editor from affecting other parts of the web page designer application;
   setting up a first message channel to the first untrusted custom attribute editor through the first custom editor sandbox;
   adding the first custom editor sandbox to the component edit panel;
   creating one or more native attribute editors; and
   adding the one or more native attribute editors to the component edit panel;
   wherein the first untrusted custom attribute editor is isolated from the one or more native attribute editors by the first custom editor sandbox.

9. The computer-implemented method of claim 8, comprising:
   getting a custom attribute editor definition;
   creating a second untrusted custom attribute editor based at least in part on the custom attribute editor definition;
   creating a second custom editor sandbox nested within the first custom editor sandbox to isolate the second untrusted custom attribute editor from the first untrusted custom attribute editor and other parts of the web page designer application; and
   setting up a second message channel to the second untrusted custom attribute editor through the second custom editor sandbox.

10. The computer-implemented method of claim 9, comprising:
    recursively creating nested one or more untrusted custom attribute editors and associated custom editor sandboxes based on custom attribute editor definitions.

11. The computer-implemented method of claim 8, wherein the component edit panel provides the user interface of the web page designer application for a merchant to configure one or more custom attributes of a component of a web page.

12. The computer-implemented method of claim 8, wherein the first untrusted custom attribute editor is provided to the web page designer application by a third-party custom attribute editor developer.

13. The computer-implemented of claim 8, comprising securely communicating information from the web page designer application to the first untrusted custom attribute editor within the first custom editor sandbox, and from the first untrusted custom attribute editor within the first custom editor sandbox to the web page designer application, over the first message channel.

14. The computer-implemented method of claim 8, comprising:
getting a first custom attribute definition from a first custom database; and
getting one or more native attribute definitions from a database of the web page designer application.

15. A non-transitory machine-readable storage medium having instructions stored therein, which when executed by one or more processors of a computing device, causes the computing device to:
create a component edit panel for a user interface of a web page designer application;
create a first untrusted custom attribute editor;
create a first custom editor sandbox to prevent an error occurring in the first untrusted custom attribute editor from affecting other parts of the web page designer application;
set up a first message channel to the first custom attribute editor through the first custom editor sandbox;
add the first custom editor sandbox to the component edit panel;
create one or more native attribute editors; and
add the one or more native attribute editors to the component edit panel;
wherein the first untrusted custom attribute editor is isolated from the one or more native attribute editors by the first custom editor sandbox.

16. The non-transitory machine-readable storage medium of claim 15, having instructions stored therein, which when executed by one or more processors of a computing device, causes the computing device to:
get a custom attribute editor definition;
create a second untrusted custom attribute editor based at least in part on the custom attribute editor definition;
create a second custom editor sandbox nested within the first custom editor sandbox to isolate the second untrusted custom attribute editor from the first untrusted custom attribute editor and other parts of the web page designer application; and
set up a second message channel to the second untrusted custom attribute editor through the second custom editor sandbox.

17. The non-transitory machine-readable storage medium of claim 16, having instructions stored therein, which when executed by one or more processors of a computing device, causes the computing device to:
recursively create nested one or more untrusted custom attribute editors and associated custom editor sandboxes based on custom attribute editor definitions.

\* \* \* \* \*